(12) United States Patent
Kassner

(10) Patent No.: US 12,140,771 B2
(45) Date of Patent: Nov. 12, 2024

(54) EYE TRACKING MODULE AND HEAD-WEARABLE DEVICE

(71) Applicant: PUPIL LABS GmbH, Berlin (DE)

(72) Inventor: Moritz Kassner, Berlin (DE)

(73) Assignee: PUPIL LABS GmbH, Berlin (DE)

( * ) Notice: Subject to any disclaimer, the term of this patent is extended or adjusted under 35 U.S.C. 154(b) by 69 days.

(21) Appl. No.: 17/621,361

(22) PCT Filed: Feb. 19, 2020

(86) PCT No.: PCT/EP2020/054386
§ 371 (c)(1),
(2) Date: Dec. 21, 2021

(87) PCT Pub. No.: WO2021/164867
PCT Pub. Date: Aug. 26, 2021

(65) Prior Publication Data
US 2022/0342224 A1    Oct. 27, 2022

(51) Int. Cl.
*G02B 27/01*       (2006.01)
*G06F 3/01*        (2006.01)
*H04N 23/90*       (2023.01)

(52) U.S. Cl.
CPC ..... *G02B 27/0179* (2013.01); *G02B 27/0176* (2013.01); *G06F 3/013* (2013.01); *H04N 23/90* (2023.01); *G02B 2027/0187* (2013.01)

(58) Field of Classification Search
CPC ............... G06F 2111/18; G06F 3/0481; G06F 3/04817; G06F 9/4443; G06F 3/04847;
(Continued)

(56) References Cited

U.S. PATENT DOCUMENTS 4,852,988 A   8/1989   Velez et al.
6,091,546 A   7/2000   Spitzer
(Continued)

FOREIGN PATENT DOCUMENTS

CA    2967756    10/2005
CA    2750287    11/2011
(Continued)

OTHER PUBLICATIONS

Notice of Allowance dated Mar. 30, 2022 in U.S. Appl. No. 16/967,304.
(Continued)

*Primary Examiner* — Charles Tseng
(74) *Attorney, Agent, or Firm* — Dicke, Billig & Czaja, PLLC

(57) ABSTRACT

An eye tracking module and head-wearable device is disclosed. In one example, the eye tracking module includes a module housing which is at least substantially mirror symmetric with respect to a central plane and shaped to partly surround a nose of the user. A scene camera is arranged in and/or on the module housing. The eye tracking module further includes at least one of a first eye camera arranged in and/or on the lower portion of the module housing, wherein a first distance between the first eye camera and the central plane is at most about 20 mm, and a second eye camera arranged in and/or on the lower portion of the module housing, wherein a second distance between the second eye camera and the central plane at least substantially corresponds to the first distance.

14 Claims, 5 Drawing Sheets

(58) Field of Classification Search
CPC .............. G06F 11/3664; G06F 3/0304; G06F 3/011–015; G06V 20/20; G06T 19/00; G06T 17/00; G06T 7/00; G06T 19/006; G06T 2215/16; H04N 5/272; H04N 2201/3245; A63F 13/10; G02B 27/017
See application file for complete search history.

(56) References Cited

U.S. PATENT DOCUMENTS

| | | |
|---|---|---|
| 6,351,273 B1 | 2/2002 | Lemelson et al. |
| 6,943,754 B2 | 9/2005 | Aughey et al. |
| 7,488,294 B2 | 2/2009 | Torch |
| 7,815,311 B2 | 10/2010 | Johns et al. |
| 8,342,687 B2 | 1/2013 | Blixt et al. |
| 8,594,374 B1 | 11/2013 | Bozarth |
| 8,624,994 B2 | 1/2014 | Kaneda et al. |
| 8,830,142 B1 | 1/2014 | Kim et al. |
| 8,752,963 B2 | 6/2014 | McCulloch et al. |
| 8,761,459 B2 | 6/2014 | Kaneda et al. |
| 8,836,768 B1 | 9/2014 | Rafii et al. |
| 8,929,589 B2 | 1/2015 | Publicover et al. |
| 8,982,046 B2 | 3/2015 | Edwards et al. |
| 9,185,352 B1 | 11/2015 | Jacques |
| 9,189,095 B2 | 11/2015 | Eden et al. |
| 9,207,760 B1 | 12/2015 | Wu et al. |
| 9,253,442 B1 | 2/2016 | Pauli |
| 9,380,287 B2 | 6/2016 | Nistico et al. |
| 9,405,365 B2 | 8/2016 | Publicover et al. |
| 9,451,166 B1 | 9/2016 | Ribardo, Jr. et al. |
| 9,501,683 B1 | 11/2016 | Hatstat et al. |
| 9,529,442 B2 | 12/2016 | Cho et al. |
| 9,600,069 B2 | 3/2017 | Publicover et al. |
| 9,668,648 B2 | 6/2017 | Pfleger et al. |
| 9,672,416 B2 | 6/2017 | Zhang et al. |
| 9,693,684 B2 | 7/2017 | Lopez et al. |
| 9,727,136 B2 | 8/2017 | Willairat et al. |
| 9,737,209 B2 | 8/2017 | Gramatikov et al. |
| 9,785,233 B2 | 10/2017 | San Agustin Lopez et al. |
| 9,801,539 B2 | 10/2017 | Kerr et al. |
| 9,811,158 B2 | 11/2017 | Hennessey et al. |
| 9,851,091 B2 | 12/2017 | Im et al. |
| 9,936,195 B2 | 4/2018 | Horesh |
| 9,958,941 B2 | 5/2018 | Gustafsson et al. |
| 9,961,307 B1 | 5/2018 | Weinblatt |
| 9,977,960 B2 | 5/2018 | Gustafsson et al. |
| 10,016,131 B2 | 7/2018 | Liu et al. |
| 10,048,749 B2 | 8/2018 | Miao et al. |
| 10,114,459 B2 | 10/2018 | Algotsson et al. |
| 10,157,313 B1 | 12/2018 | Zhang et al. |
| 10,229,511 B2 | 3/2019 | Meier |
| 10,285,589 B2 | 5/2019 | Hart et al. |
| 10,303,250 B2 | 5/2019 | Jeong |
| 10,307,053 B2 | 6/2019 | Fayolle |
| 10,416,764 B2 | 9/2019 | Wanner et al. |
| 10,438,373 B2 | 10/2019 | Wang et al. |
| 10,452,137 B2 | 10/2019 | Noda et al. |
| 10,488,668 B2 | 11/2019 | Cazalet |
| 10,489,680 B2 | 11/2019 | Aliabadi et al. |
| 10,496,160 B2 | 12/2019 | Lu et al. |
| 10,514,542 B2 | 12/2019 | Erinjippurath et al. |
| 10,546,193 B2 | 1/2020 | Schmidt et al. |
| 10,546,194 B2 | 1/2020 | Tsurumi |
| 10,634,934 B2 | 4/2020 | Chene et al. |
| 10,698,205 B2 | 6/2020 | Huang |
| 10,909,711 B2 | 2/2021 | Schroeder et al. |
| 10,976,813 B2 | 4/2021 | Nistico et al. |
| 11,017,558 B2 | 5/2021 | Noble et al. |
| 11,023,038 B2 | 6/2021 | Yasuda et al. |
| 11,033,204 B2 | 6/2021 | Massonneau et al. |
| 2003/0184868 A1 | 10/2003 | Geist |
| 2004/0174496 A1 | 9/2004 | Ji et al. |
| 2005/0034287 A1 | 2/2005 | Xie |
| 2005/0225723 A1 | 10/2005 | Pilu |
| 2006/0240005 A1 | 10/2006 | Velardi |
| 2006/0279692 A1 | 12/2006 | Bruck |
| 2007/0066916 A1 | 3/2007 | Lemos |
| 2009/0190026 A1 | 7/2009 | Chen |
| 2010/0045933 A1 | 2/2010 | Eberl et al. |
| 2010/0053555 A1 | 3/2010 | Enriquez et al. |
| 2010/0220288 A1 | 9/2010 | Cleveland |
| 2012/0212593 A1 | 8/2012 | Na'aman et al. |
| 2012/0290401 A1 | 11/2012 | Neven |
| 2012/0293773 A1 | 11/2012 | Publicover et al. |
| 2013/0050070 A1 | 2/2013 | Lewis et al. |
| 2013/0066213 A1 | 3/2013 | Wellington |
| 2013/0069883 A1 | 3/2013 | Oga |
| 2013/0083976 A1 | 4/2013 | Ragland |
| 2013/0100025 A1 | 4/2013 | Vernacchia |
| 2013/0114043 A1 | 5/2013 | Balan et al. |
| 2013/0120224 A1 | 5/2013 | Cajigas et al. |
| 2013/0207887 A1 | 8/2013 | Raffle et al. |
| 2013/0222213 A1 | 8/2013 | Abdollahi et al. |
| 2013/0318776 A1 | 12/2013 | Jacobs et al. |
| 2013/0321925 A1 | 12/2013 | Jacobs et al. |
| 2014/0022371 A1 | 1/2014 | Huang et al. |
| 2014/0043581 A1 | 2/2014 | Chen |
| 2014/0049452 A1 | 2/2014 | Maltz |
| 2014/0055591 A1 | 2/2014 | Katz |
| 2014/0055746 A1 | 2/2014 | Nistico et al. |
| 2014/0055747 A1 | 2/2014 | Nistico et al. |
| 2014/0152558 A1 | 6/2014 | Salter et al. |
| 2014/0156219 A1 | 6/2014 | Soubra et al. |
| 2014/0191927 A1 | 7/2014 | Cho |
| 2014/0218281 A1 | 8/2014 | Amayeh et al. |
| 2014/0226131 A1 | 8/2014 | Lopez et al. |
| 2014/0247232 A1 | 9/2014 | George-Svahn et al. |
| 2014/0285404 A1 | 9/2014 | Takano et al. |
| 2014/0354953 A1 | 12/2014 | Chen et al. |
| 2015/0070470 A1 | 3/2015 | McMurrough |
| 2015/0085251 A1 | 3/2015 | Larsen |
| 2015/0169050 A1 | 6/2015 | Publicover et al. |
| 2015/0181100 A1 | 6/2015 | Publicover et al. |
| 2015/0302585 A1 | 10/2015 | VanBlon et al. |
| 2015/0310263 A1 | 10/2015 | Zhang et al. |
| 2016/0004306 A1 | 1/2016 | Maltz |
| 2016/0005176 A1 | 1/2016 | Nguyen et al. |
| 2016/0011658 A1 | 1/2016 | Lopez et al. |
| 2016/0166190 A1 | 1/2016 | Publicover et al. |
| 2016/0109945 A1 | 4/2016 | Kempinski |
| 2016/0126675 A2 | 5/2016 | Daoura |
| 2016/0166146 A1 | 6/2016 | Sarkar |
| 2016/0187969 A1 | 6/2016 | Larsen et al. |
| 2016/0202756 A1 | 7/2016 | Wu et al. |
| 2016/0206196 A1 | 7/2016 | Pfleger et al. |
| 2016/0224110 A1 | 8/2016 | Massonneau et al. |
| 2016/0246367 A1 | 8/2016 | Tungare et al. |
| 2016/0252751 A1 | 9/2016 | Kim |
| 2016/0262608 A1 | 9/2016 | Krueger |
| 2016/0267708 A1 | 9/2016 | Nistico et al. |
| 2016/0286110 A1 | 9/2016 | Ribardo, Jr. et al. |
| 2016/0328016 A1 | 11/2016 | Andersson et al. |
| 2017/0004363 A1 | 1/2017 | Dore et al. |
| 2017/0017299 A1 | 1/2017 | Biedert et al. |
| 2017/0031437 A1 | 2/2017 | Qian et al. |
| 2017/0035293 A1 | 2/2017 | Nistico et al. |
| 2017/0038607 A1 | 2/2017 | Camara |
| 2017/0116476 A1 | 4/2017 | Publicover et al. |
| 2017/0123491 A1 | 5/2017 | Hansen |
| 2017/0136626 A1 | 5/2017 | Wang et al. |
| 2017/0176778 A1 | 6/2017 | Ushakov |
| 2017/0188823 A1 | 7/2017 | Ganesan et al. |
| 2017/0243387 A1 | 8/2017 | Li et al. |
| 2017/0276934 A1 | 9/2017 | Sarkar |
| 2017/0308734 A1 | 10/2017 | Chalom et al. |
| 2017/0332901 A1 | 11/2017 | Hwang et al. |
| 2017/0351326 A1 | 12/2017 | Aarts et al. |
| 2017/0363885 A1 | 12/2017 | Blum et al. |
| 2017/0372487 A1 | 12/2017 | Lagun et al. |
| 2018/0018451 A1 | 1/2018 | Spizhevoy et al. |
| 2018/0032131 A1 | 2/2018 | Yasuda et al. |
| 2018/0059782 A1 | 3/2018 | San Agustin et al. |
| 2018/0089834 A1 | 3/2018 | Spizhevoy et al. |
| 2018/0092592 A1 | 4/2018 | Tzvieli et al. |
| 2018/0095295 A1 | 4/2018 | Chene et al. |

(56) References Cited

U.S. PATENT DOCUMENTS

| | | |
|---|---|---|
| 2018/0103194 A1 | 4/2018 | Tang |
| 2018/0103903 A1 | 4/2018 | Tzvieli et al. |
| 2018/0137358 A1 | 5/2018 | Rousseau et al. |
| 2018/0157045 A1 | 6/2018 | Davami |
| 2018/0157892 A1 | 6/2018 | Han et al. |
| 2018/0180893 A1 | 6/2018 | Gupta |
| 2018/0181809 A1 | 6/2018 | Ranjan et al. |
| 2018/0267604 A1 | 9/2018 | Bhattacharya |
| 2018/0286070 A1 | 10/2018 | Benedetto |
| 2019/0005679 A1 | 1/2019 | Nie |
| 2019/0043216 A1 | 2/2019 | Yabuuchi et al. |
| 2019/0076015 A1 | 3/2019 | Johansson et al. |
| 2019/0080474 A1 | 3/2019 | Lagun et al. |
| 2019/0082170 A1 | 3/2019 | Akahori |
| 2019/0086669 A1 | 3/2019 | Percival et al. |
| 2019/0087973 A1 | 3/2019 | Kaehler et al. |
| 2019/0156100 A1 | 5/2019 | Rougeaux et al. |
| 2019/0265788 A1 | 8/2019 | Yosha et al. |
| 2020/0183190 A1 | 6/2020 | Rousseau et al. |
| 2020/0335065 A1 | 10/2020 | Furuta et al. |
| 2020/0355927 A1* | 11/2020 | Marcellin-Dibon ......................... G02B 27/0172 |
| 2020/0364453 A1 | 11/2020 | Tonsen et al. |
| 2021/0041701 A1 | 2/2021 | Kassner et al. |
| 2021/0049410 A1 | 2/2021 | Dierkes et al. |
| 2021/0247617 A1 | 8/2021 | Kassner et al. |
| 2022/0083134 A1* | 3/2022 | Kassner .................. G06F 3/013 |
| 2022/0342224 A1* | 10/2022 | Kassner ............. G02B 27/0179 |

FOREIGN PATENT DOCUMENTS

| | | | | |
|---|---|---|---|---|
| CN | 102930252 | 2/2013 | | |
| CN | 103356163 | 10/2013 | | |
| CN | 105676456 | 6/2016 | | |
| CN | 106599994 | 4/2017 | | |
| CN | 206805020 | 12/2017 | | |
| CN | 107545302 | 1/2018 | | |
| CN | 107564062 | 1/2018 | | |
| CN | 109254420 | 1/2019 | | |
| CN | 109298533 | 2/2019 | | |
| CN | 109820524 | 5/2019 | | |
| CN | 113189796 A * | 7/2021 | ......... | G02B 27/0172 |
| DE | 19807902 | 9/1999 | | |
| DE | 102009049849 | 4/2011 | | |
| DE | 10 2010 018 562 | 10/2011 | | |
| DE | 10 2014 206 623 | 10/2015 | | |
| DE | 10 2016 210 288 | 12/2017 | | |
| EP | 1403680 | 3/2004 | | |
| EP | 1755441 | 2/2007 | | |
| EP | 1027627 | 2/2009 | | |
| EP | 2096577 | 9/2009 | | |
| EP | 2309307 | 4/2011 | | |
| EP | 2416280 | 2/2012 | | |
| EP | 2490155 | 8/2012 | | |
| EP | 2573650 | 3/2013 | | |
| EP | 2784632 | 10/2014 | | |
| EP | 2805671 | 11/2014 | | |
| EP | 2886041 | 6/2015 | | |
| EP | 2795888 | 9/2015 | | |
| EP | 2940555 | 11/2015 | | |
| EP | 2943835 | 11/2015 | | |
| EP | 2956844 | 12/2015 | | |
| EP | 2980628 | 2/2016 | | |
| EP | 3005030 | 4/2016 | | |
| EP | 3047883 | 7/2016 | | |
| EP | 3059629 | 8/2016 | | |
| EP | 3112922 | 1/2017 | | |
| EP | 3129849 | 2/2017 | | |
| EP | 3135464 | 3/2017 | | |
| EP | 3137938 | 3/2017 | | |
| EP | 3228238 | 10/2017 | | |
| EP | 3236338 | 10/2017 | | |
| EP | 3252566 | 12/2017 | | |
| EP | 3258308 | 12/2017 | | |
| EP | 3267295 | 2/2018 | | |
| EP | 3305176 | 4/2018 | | |
| EP | 3305179 | 4/2018 | | |
| EP | 3376163 | 9/2018 | | |
| EP | 3460785 | 3/2019 | | |
| EP | 3521911 | 8/2019 | | |
| FR | 3081565 | 11/2019 | | |
| TW | M401786 | 4/2011 | | |
| WO | 9905988 | 2/1999 | | |
| WO | 9926126 | 5/1999 | | |
| WO | 2005009466 | 2/2005 | | |
| WO | 2005094667 | 10/2005 | | |
| WO | 2007/016739 | 2/2007 | | |
| WO | 2009043927 | 4/2009 | | |
| WO | 2010071928 | 7/2010 | | |
| WO | 2011/144932 | 11/2011 | | |
| WO | 2012052061 | 4/2012 | | |
| WO | 2013059940 | 5/2013 | | |
| WO | 2013067230 | 5/2013 | | |
| WO | 2014/033306 | 3/2014 | | |
| WO | 2014085789 | 6/2014 | | |
| WO | 2014186620 | 11/2014 | | |
| WO | 2015024031 | 2/2015 | | |
| WO | 2015/051834 | 4/2015 | | |
| WO | 2015/072202 | 5/2015 | | |
| WO | 2015/179253 | 11/2015 | | |
| WO | 2016025583 | 2/2016 | | |
| WO | 2016074861 | 5/2016 | | |
| WO | 2016078911 | 5/2016 | | |
| WO | 2016097919 | 6/2016 | | |
| WO | 2016111880 | 7/2016 | | |
| WO | 2016146486 | 9/2016 | | |
| WO | 2016146488 | 9/2016 | | |
| WO | 2017001146 | 1/2017 | | |
| WO | 2017025486 | 2/2017 | | |
| WO | 2017027352 | 2/2017 | | |
| WO | 2017/046419 | 3/2017 | | |
| WO | 2017053966 | 3/2017 | | |
| WO | 2017053971 | 3/2017 | | |
| WO | 2017053972 | 3/2017 | | |
| WO | 2017053974 | 3/2017 | | |
| WO | 2017/096396 | 6/2017 | | |
| WO | 2017151206 | 9/2017 | | |
| WO | 2017/216118 | 12/2017 | | |
| WO | 2018000020 | 1/2018 | | |
| WO | 2018000039 | 1/2018 | | |
| WO | 2018063451 | 4/2018 | | |
| WO | 2018149875 | 8/2018 | | |

OTHER PUBLICATIONS

Moritz Kassner, Will Patera, Andreas Bulling: "Pupil: An Open Source Platform for Pervasive Eye Tracking and Mobile Gaze-based Interaction", Proceedings of the 2014 ACM International Joint Conference on Pervasive and Ubiquitous Computing: Adjunct Publication, pp. 1151-1160, ACM Sep. 13-17, 2014.

Marc Tonsen, Andreas Bulling et al: "InvisibleEye: Mobile Eye Tracking Using Multiple Low-Resolution Cameras and Learning-Based Gaze Estimation", Proceedings of the ACM on Interactive, Mobile, Wearable and Ubiquitous Technologies, vol. 1, No. 3, Article 106, Sep. 2017.

Mayberry, Addison, et al. "iShadow: design of a wearable, real-time mobile gaze tracker." Proceedings of the 12th annual international conference on Mobile systems, applications, and services, p. 82-94, ACM, 2014.

Mayberry PhD thesis, Leveraging Eye Structure and Motion to Build a Low-Power Wearable Gaze Tracking System, Oct. 2018.

Ishiguro, Yoshio, et al. "Aided eyes: eye activity sensing for daily life." Proceedings of the 1st Augmented Human International Conference. ACM, 2010.

Fuhl, Wolfgang, et al. "PupilNet: convolutional neural networks for robust pupil detection." arXiv preprint arXiv:1601.04902 (2016).

Baluja, Shumeet, and Dean Pomerleau. "Non-intrusive gaze tracking using artificial neural networks." Advances in Neural Information Processing Systems. 1994.

(56) References Cited

OTHER PUBLICATIONS

Pomplun et al. "An artificial neural network for high precision eye movement tracking", Advances in Artificial Intelligence, vol. 861 of the series Lecture Notes in Computer Science, pp. 63-69. 2005.

Zhang, Xucong, et al. "Appearance-based gaze estimation in the wild." Proceedings of the IEEE Conference on Computer Vision and Pattern Recognition. 2015.

Zhang, Xucong, et al. "It's written all over your face: Full-face appearance-based gaze estimation." Computer Vision and Pattern Recognition Workshops (CVPRW), 2017 IEEE Conference on. IEEE, 2017.

Feng Lu, Yusuke Sugano, Takahiro Okabe, and Yoichi Sato: "Adaptive Linear Regression for Appearance-Based Gaze Estimation", IEEE transactions on pattern analysis and machine intelligence (TPAMI) 36, 10 (2014), 2033-2046.

Cihan Topal, Serkan Gunal, Onur Koçdeviren, Atakan Doğan, and Ömer N Gerek: "A Low-Computational Approach on Gaze Estimation With Eye Touch System", IEEE transactions on Cybernetics 44, 2 (2013), 228-239.

Krafka, et al. "Eye tracking for everyone." IEEE Conference on Computer Vision and Pattern Recognition (CVPR), pp. 2176-2184, 2016.

Sugano, Bulling: "Self-calibrating head-mounted eye trackers using egocentric visual saliency." In Proc. ACM Symposium on User Interface Software and Technology (UIST 2015). 363-372.

Huang, Veeraraghavan, Sabharwal: "TabletGaze: Unconstrained appearance-based gaze estimation in mobile tablets" Jul. 16, 2016.

Hickson et al., "Eyemotion: Classifying facial expressions in VR using eye-tracking cameras", arXiv:1707.07204v2 [cs.CV] Jul. 28, 2017.

Anjith George, Aurobinda Routray: "Real-time Eye Gaze Direction Classification Using Convolutional Neural Network", IEEE InternationalConference on Signal Processing and Communication, SPCOM 2016.

Olszewski, K., Lim, J., Saito, S., Li, H.: "High-Fidelity Facial and Speech Animation for VR HMDs". ACM Trans. Graph.35, 6, Article 221 (Nov. 2016).

"Pogocam", Youtube, Jan. 6, 2017, URL: https://www.youtube.com/watc67v=pHumrhISYx4.

Santini, Fuhl, Kasneci: "CalibMe: Fast and Unsupervised Eye Tracker Calibration for Gaze-Based Pervasive Human-Computer Interaction", Proc. CHI 2017, May 6-11, 2017.

Bace, Staal, Sörös: "Wearable Eye Tracker Calibration at Your Fingertips", Proc. ETRA 2018, Jun. 14-17, 2018, Warsaw/Poland.

Swirski, Dodgson: "A fully-automatic, temporal approach to single camera, glint-free 3D eye model fitting", Proc. PETMEI Lund/Sweden, Aug. 13, 2013.

Safaee-Rad, R., Tchoukanov, I., Smith, K., & Benhabib, B. (1992). "Three-dimensional location estimation of circular features for machine vision", IEEE Transactions on Robotics and Automation, 8(5), 624-640.

Dierkes, Kassner, Bulling: "A novel approach to single camera, glint-free 3D eye model fitting including corneal refraction", Proc. ETRA Warsaw/Poland Jun. 2018.

Dierkes, Kassner, Bulling: "A fast approach to refraction-aware eye-model fitting and gaze prediction", Proc. ETRA Denver/USA Jun. 25-28, 2019.

Non-Final Office Action dated Apr. 14, 2021 in U.S. Appl. No. 16/967,090. (126).

Notice of Allowance dated Jul. 21, 2021 in U.S. Appl. No. 16/967,090. (126).

Notice of Allowance dated Oct. 20, 2021 in U.S. Appl. No. 16/967,090. (126).

Non-Final Office Action dated Dec. 17, 2021 in U.S. Appl. No. 16/967,304. (127).

Non-Final Office Action dated Jun. 23, 2021 in U.S. Appl. No. 16/967,323 (128).

Final Office Action dated Nov. 5, 2021 in U.S. Appl. No. 16/967,323 (128).

Non-Final Office Action dated Jan. 27, 2022 in U.S. Appl. No. 16/967,323 (128).

Non-Final Office Action dated Jun. 24, 2021 in U.S. Appl. No. 16/967,363 (129).

Final Office Action dated Jan. 6, 2022 in U.S. Appl. No. 16/967,363 (129).

Krafka, Building Real-Time Unconstrained, Eye Tracking with Deep Learning, B.S., University of Georgia, Dec. 2015. (112 pgs.).

Krafka, et al., "Eye Tracking for Everyone", University of Georgia, pp. 2176-2184, 2016. (9 pgs.).

Abstract Book—CVPR-2016 Main Conference and Workshops, 2016.

\* cited by examiner

EYE TRACKING MODULE AND HEAD-WEARABLE DEVICE

CROSS-REFERENCE TO RELATED APPLICATIONS

This Utility Patent Application claims priority under 35 U.S.C. § 371 to International Application Serial No. PCT/EP2020/054386, filed Feb. 19, 2020, which is incorporated herein by reference in its entirety.

TECHNICAL FIELD

Embodiments of the present invention relate to eye tracking modules and head-wearable devices that may be used for eye tracking and/or to detect one or more gaze-related parameters of a user.

BACKGROUND

Portable eye tracking devices, for example in the form of head-wearable spectacle-like systems offer many advantages over stationary, remote eye tracking systems when it comes to the range of possible application scenarios and use cases. Outdoor activities like sports or tasks like operating large machinery are examples for eye tracking application areas in which free head and body movement is required and for which head-worn devices are thus the solution of choice. At the same time, such use cases often also require the wearer to wear specialized eyewear, like protective eyeglasses of various kinds. Pilot visor helmets, skiing- or swimming-goggles, sports helmets, head-band structures and welding protective googles are further examples. Further, physiological features like head or nose shapes of the wearers can vary in wide ranges, e.g. as a function of ethnicity or age.

As a result, these portable devices traditionally provide integrated spectacle-type systems which do not provide enough flexibility to fit different specialized scenarios and/or are not suitable for children.

Accordingly, there is a need to further improve portable eye trackers and head-wearable devices, respectively, in particular with regard to flexibility and/or adaptability to different use cases.

SUMMARY

According to an embodiment of an eye tracking module for attachably complementing a head-wearable device of a user, the eye tracking module includes a module housing which is, at least in a lower portion, at least substantially mirror symmetric with respect to a central plane and shaped to partly surround a nose of the user. A scene camera is arranged in and/or on the module housing. The eye tracking module further includes at least one of a first eye camera arranged in and/or on the lower portion of the module housing, and a second eye camera arranged in and/or on the lower portion of the module housing. A first distance between the first eye camera and the central plane is at most about 20 mm. A second distance between the second eye camera and the central plane at least substantially corresponds to the first distance and/or is at most about 20 mm.

According to an embodiment of an eye tracking module for attachably complementing a head-wearable device of a user, the eye tracking module includes a module housing which is, at least in a lower portion, at least substantially mirror symmetric with respect to a central plane and shaped to partly surround a nose of the user. A scene camera is arranged in and/or on the module housing. At least one of a first eye camera and a second eye camera is arranged in and/or on the lower portion of the module housing. The eye tracking module further includes an electric connector arranged in and/or on the module housing. The electric connector is in electric connection with at least one of the scene camera, the first eye camera and the second eye camera.

According to an embodiment of a head-wearable device, the head-wearable device includes a frame having a central portion which is, when the head-wearable device is worn by a user, arranged next to, typically closest to a nose of the user, and a first electric connector arranged in and/or on the central portion.

Other embodiments include systems and sets including one or more head-wearable devices and an eye tracking module as described herein for complementing the one or more head-wearable devices.

Those skilled in the art will recognize additional features and advantages upon reading the following detailed description, and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

Figure 1A:
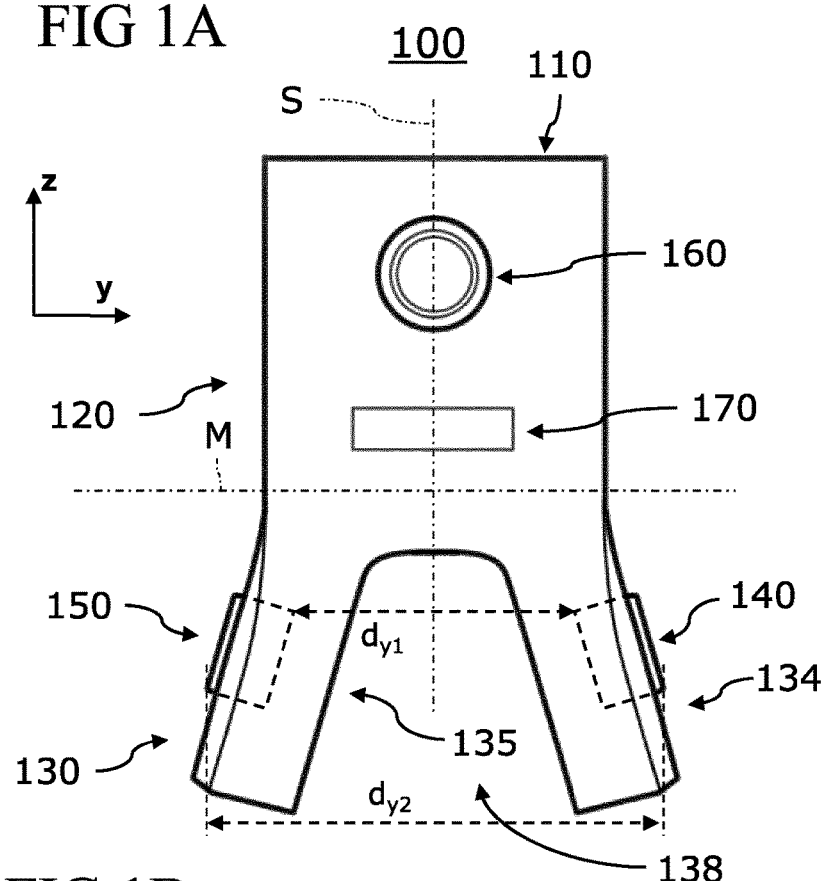
FIG. 1A illustrates a front view of an eye tracking module for attachably complementing a head-wearable device of a user according to an embodiment.

For sake of clarity, the Figures are provided with a respective Cartesian co-ordinate system x, y, z typically representing a respective eye tracking module coordinate system and scene camera coordinate system, respectively.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is a task of the invention to provide more flexible portable eye tracking devices and systems.

Said task is solved by the subject matter of the independent claims.

According to an embodiment, an eye tracking module includes a module housing which is, at least in a lower portion, shaped to partly surround a nose of the user, in particular a nasal bridge of the user's nose, and at least substantially mirror symmetric with respect to a (virtual) central plane of at least the lower portion, i.e. the lower portion or even the complete module housing are at least substantially mirror symmetric with respect to the central plane. A scene camera is arranged in and/or on the module housing. A first eye camera and/or a second eye camera are arranged in and/or on the lower portion of the module housing. A first distance between the first eye camera and the central plane is at most about 20 mm. A second distance between the second eye camera and the central plane at least substantially corresponds to the first distance and/or is at most about 20 mm.

The term "at least substantially mirror symmetric with respect to a plane" as used within specification intends to describe that at least the outer shells or boundaries of two elements or objects are mirror symmetric with respect to the plane with an accuracy which is typically achievable with the materials and manufacturing methods used, in particular with an accuracy of at least 5% or even at least 2% or 1%, at least on average, and/or that two (virtual) parts of an outer shell or boundary of one element or object are mirror symmetric with respect to the plane with an accuracy of at least 5% or even at least 2% or 1%, at least on average. In particular, a centre of gravity of the outer shells lies within the plane or is at most about 1 mm or even at most about 0.5 mm, more typically at most about 0.2 mm spaced apart from the plane.

Likewise, the term that "a second distance at least substantially corresponds to the first distance" as used within specification intends to describe that a relative difference between the first distance and the second distance is at most about 5%, more typically at most about 2% or even 1%, and/or that an absolute difference between the first distance and the second distance is at most about 1 mm, more typically at most about 0.5 mm or even 0.2 mm.

The eye tracking module may be used for attachably complementing and/or completing head-wearable devices configured for being wearable on a user's head, in particular head-wearable devices as described herein.

At least one of the first distance and the second distance may be at most about 15 mm, at most about 14 mm, or even at most about 12 mm.

Further, at least one of the first distance and the second distance may be at least about 2 mm or even at least about 5 mm.

Typically, the eye tracking module both has a first eye camera for taking first images of at least a portion of a first eye of the user, e.g. a left eye, of the user, and a second eye camera for taking second images of at least a portion of a second eye of the user, e.g. of a right eye of the user. In the following the first and second eye cameras are also referred to as left eye camera and right eye camera, and as left camera and right camera, respectively.

Within this specification the terms "first camera", "first eye camera" and "left camera" are used synonymously. Likewise, the terms "second camera", "second eye camera" and "right camera" are used synonymously herein.

In other words, the eye tracking module typically comprises a left camera and a right eye camera, wherein the left camera serves for taking a left image or a stream of images of at least a portion of the left eye of the user, and wherein the right camera takes an image or a stream of images of at least a portion of a right eye of the user. Typically, the left eye camera and the right eye camera are arranged at least substantially mirror-symmetric with respect to the central plane.

However, for some applications one eye camera may suffice.

The recorded eye images do not necessarily need to be a picture as visible by the human eye, but can also be an appropriate representation of the recorded (filmed) eye in a range of light non-visible for humans.

The recorded eye images may e.g. be used for determining one or more gaze-related parameters of a user wearing a head-wearable device provided with the eye tracking module. However, this is typically done by an external device, e.g. a companion device.

The gaze-direction related parameter may be a gaze direction, a cyclopean gaze direction, a 3D gaze point, a 2D gaze point, a visual axis orientation, an optical axis orientation, a pupil axis orientation, and a line of sight orientation of the user.

The gaze-related parameter may be a gaze-direction related parameter or a position and/or an eyelid closure, a pupil area, a pupil size, a pupil diameter, a measure of cognitive load, a sclera characteristic, an iris diameter, a characteristic of a blood vessel, a cornea characteristic of at least one eye, a cornea radius, an eyeball radius, a distance pupil-center to cornea-center, a distance cornea-center to eyeball-center, a distance pupil-center to limbus center, a cornea keratometric index of refraction, a cornea index of refraction, a vitreous humor index of refraction, a distance crystalline lens to eyeball-center, to cornea center and/or to corneal apex, a crystalline lens index of refraction, a degree of astigmatism, an orientation angle of a flat and/or a steep axis, a limbus major and/or minor axes orientation, an eye cyclo-torsion, an eye intra-ocular distance, an eye vergence, a statistics over eye adduction and/or eye abduction, and a statistics over eye elevation and/or eye depression, data about blink events, drowsiness and/or awareness of the user, parameters for user iris verification and/or identification.

The scene camera may be used for taking images of a field of view of the user wearing the head-wearable device provided with the eye tracking module. In the following, the images of the field of view of the user are also referred to as scene images. The scene camera hence must not be understood as a camera for taking a picture of an eye of the user. As the eye tracking module also includes a scene camera, it is in the following also referred to as (add-on) camera module.

Corresponding scene and eye images may e.g. be used to determine what the user is looking at. Again, this is typically done by the external device.

Points and directions may be specified within the scene camera images, an eye camera coordinate system, a scene camera coordinate system, an eye tracking module coordinate system, a head coordinate system, a world coordinate system and/or any other suitable coordinate system.

Due to placing the eye camera(s) close to the central plane of the module housing, the tracking module may be comparatively compact. In the following, the central plane is also referred to as vertical plane and middle plane, respectively.

When the tracking module is attached to a frame of a head-wearable device, the field of view of wearer may not be occluded, at least not discernible for the wearer. Note that an obstruction of the visible field of the user may essentially not be noticeable by the user since the human mind mostly ignores any obstruction in the nose area of the face, because the nose itself forms a permanent obstruction of the optical field.

Further, the tracking module may easily be adapted to different wearers and use cases/scenarios.

Furthermore, mass production of generic eye tracking modules for combination with frames specialized for different use cases/scenarios such as spectacle-style frames, special purpose goggles, a helmet or even just a headband-like structure is facilitated. Accordingly, overall manufacturing costs may be reduced. Note that a user may have only one eye tracking module fitting to different frames and head-wearable devices, respectively.

The scene camera is typically centrally arranged, i.e. at least close to the central plane and/or close to (expected) eye midpoint of the user. The latter also facilitates a compact design. Furthermore, the influence of parallax error for gaze prediction may be reduces this way significantly.

For example, in a cross-section perpendicular to the optical axis of the scene camera and/or a projection onto a plane perpendicular to the optical axis of the scene camera, at least one of a maximum extension of the module housing and a maximum extension of the lower portion of the module housing may be at most about 4 cm, more typically at most about 3 cm or even 2.5 cm.

Further, in the central plane and/or a projection onto a plane parallel to the central plane, at least one of a further maximum extension of the module housing and a further maximum extension of the lower portion of the module housing is at most about 4 cm, more typically at most about 3 cm or even 2.5 cm.

The module housing or even the eye tracking module may fit into an enveloping cuboid with dimensions of at most about 3 cm×5 cm×5 cm or even at most about 2 cm×4 cm×4.5 cm.

Typically, the module housing further includes an upper portion which may or may not be substantially mirror symmetric with respect to the central plane.

The scene camera is typically arranged in and/or on the upper portion of the module housing.

Furthermore, the scene camera may comprise an optical axis which is at least substantially arranged in the central plane (to reduce parallax error). Gaze estimation error due to parallax is minimized by placing the scene camera as close as possible to the eye or mid-point of the eyes.

The lower portion typically includes a first (left) leg portion and a second (right) leg portion which are at least substantially mirror-symmetric with respect to the central plane.

According to an embodiment, the eye tracking module typically further includes an electric connector arranged in and/or on the module housing, typically in and/or on the upper portion, and in electric connection with at least one of the scene camera, the first eye camera and the second eye camera, typically with all of the cameras of the eye tracking module.

Accordingly, the camera(s) of the eye tracking module may be provided with electric power through the electric connector (via an internal wiring). Thus, additional space inside the module housing for energy storage may not be required.

In other words, the eye tracking module typically includes a module housing which is, at least in a lower portion, at least substantially mirror symmetric with respect to a central plane and shaped to partly surround a nose of the user, a scene camera arranged in and/or on the module housing, at least one of a first eye camera arranged in and/or on the lower portion of the module housing, and a second eye camera arranged in and/or on the lower portion of the module housing, and an electric connector arranged in and/or on the module housing, and in electric connection with at least one of the scene camera, the first eye camera and the second eye camera. Further, a first distance between the first eye camera and the central plane is typically at most about 20 mm, and/or a second distance between the second eye camera and the central plane typically at least substantially corresponds to the first distance, and/or is at most about 20 mm.

By means of the electric connector, a simple (standardized/standardizable) connection between the eye tracking module and head-wearable device may be provided. This leave lots of design freedom for the frames of the head-wearable device it is supposed to be used with. Furthermore, the (generic) eye tracking module which includes all or at least most of the expensive electronics can be produces in large numbers, since it fits all use cases, thereby reducing cost-per-piece, while the frames of the head-wearable devices with no special electronics which are cheaper to manufacture to begin with can be produced in fewer numbers (which is usually more expensive), thus reducing overall manufacturing costs.

The electric connector is typically arranged in the central plane, for example at least substantially mirror-symmetric with respect to the central plane. This may also contribute to a compact design of the eye tracking module.

Depending on design, the electric connector may be either arranged on the same side of the module as the scene camera and/or facing in the same general direction as the scene camera or opposite thereto.

Accordingly, module designs may be provided which allow the module to be connected to head-wearable devices from the wearer side. This may be advantageous in case the general construction of the head-wearable device is such that it covers a larger portion of the facial area comprising the eyes because of some functional requirement (e.g. displays, screens, shielding in front of the eyes/face) of the head-wearable, such as in AR/VR goggles, diving goggles, welding goggles or other protective googles.

Furthermore, module designs may be provided which allow the module to be connected to head-wearable devices from the side facing away from the wearer. This may be advantageous in case the general construction of the head-wearable device prohibits any modifications of the wearer-facing side (e.g. because a hermetic seal around the eyes is provided by the head-wearable, or the head-wearable comprises electrodes that need to be in contact with the wearer's face).

Alternatively, the electric connector may be arranged on a top surface of the module. Accordingly, module designs may be provided which allow the module to be connected to head-wearable devices which do not comprise any structures which extend into the nose region of the face of the wearer when worn on the head, such as for example different helmets or head-band structures.

Further, the electric connector is typically arranged between the first eye camera and the second eye camera, and/or between the scene camera and at least one of the first eye camera and the second eye camera, at least in a projection onto a plane perpendicular to the optical axis of the scene camera and/or in a projection onto the central plane or a plane parallel to the central plane.

The electric connector may be implemented as a plug or a socket and typically fits with a corresponding electric connector of the head-wearable device.

The electric connector may be an electro-mechanical connector and/or may include one or more snap fit elements, magnets or the like. Alternatively or in addition, the electric connector may include on or more screws or threaded holes for respective screws.

Providing the module with the electric connector enables the module to be constructed comparatively compact, without the need for an internal power supply, while at the same time encapsulating the necessary camera hardware in an optimal way and preserving flexibility as to the compatibility of the module with use case specific head-wearable devices.

The module housing may also include a mechanical connector (separate to or integrated into the electro-mechanical connector) which is adapted to cooperate with a corresponding counterpart of the head-wearable device, and selected from the list of a magnetic connector, a screw connection, a snap fit connection, a friction fit, a bayonet coupling, and a velcro-based connector.

The mechanical connector may also be based on a connection principle for establishing a permanent, non-releasable connection, such as via gluing, welding or friction welding.

What has been said herein about the possible locations and arrangements of the electric connector in or on the module housing, applies mutatis mutandis to the mechanical connector.

The electric connector may also be used for data exchange (through the head-wearable device).

Typically, at least one of the scene camera and the electric connector is arranged in the central plane.

Further, at least one of the scene camera and the electric connector is, in a projection onto a plane perpendicular to the central plane arranged between the first eye camera and the second eye camera.

Even further, the electric connector is, in the projection onto a plane perpendicular to the optical axis of the scene camera, typically arranged between the scene camera and at least one of the first eye camera and the second eye camera.

Alternatively, the scene camera can, in the projection onto a plane perpendicular to the optical axis of the scene camera, be arranged between the electric connector and at least one of the first eye camera and the second eye camera.

The eye tracking module typically further includes a first nose pad attached to the lower portion, in particular the first leg portion, and/or a second nose pad attached to the lower portion, in particular the second leg portion.

The first nose pad and/or the second nose pad may be adjustable and/or exchangeable attached to the lower portion and the respective leg portion, respectively.

Further, the first eye camera may be arranged on and/or in the first leg portion and/or the second eye camera may be arranged on and/or in the second leg portion.

Typically, at least one of a first angle between an optical axis of the first eye camera and the central plane, and a second angle between an optical axis of the second eye camera and the central plane is in a range from about 150° to 142° (or −30° to about −38°), more typically about 144° (or −36°), i.e. 144°+/−1° (or −36°+/−1°). Accordingly, an optimal view of the eye cameras onto an eyeball of the user is enabled.

Furthermore, the first angle may at least substantially correspond to the second angle, i.e. with an accuracy of at least about 1° or even 0.5°.

According to a preferred embodiment, the head-wearable device comprises not more than two wearer-side facing eye cameras (one for each eye of the user) and one front-side facing scene camera.

The eye tracking module may further include a first light source arranged next to the first eye camera and/or a second light source arranged next to the second eye camera for illuminating the left eye and right eye of the user, for example a respective IR-LED.

The first light source may be arranged in and/or on the first leg portion. Likewise, the second light source may be arranged in and/or on in the second leg portion The module housing may include or even be made of two shells. Accordingly manufacturing may be facilitated.

The module housing and/or the two shells may include or may be made of a metal, in particular a light metal such as aluminium or magnesium and/or a plastics. Accordingly a particularly lightweight eye tracking module may be provided.

For example, the module housing may be made by Al- or Mg-pressure casting or die casting.

Alternatively, the module housing may be made out of a plastics, for example by injection moulding.

Further, the module housing may be at least substantially watertight and/or rigid. The latter may result in particularly precise and/or constant camera poses (after manufacturing and optional adaptation to the user). This is advantageous for achieving high eye tracking accuracy.

The eye tracking module typically further includes a controller in electric connection with at least one of the electric connector, the scene camera, the first eye camera and the second eye camera, more typically with the electric connector and all cameras.

The controller is typically arranged within in the module housing, more typically enclosed by the module housing.

The controller may be configured for at least one of:
receiving control commands via the electric connector;
triggering a respective image or video recording of the scene camera, the first eye camera and/or the second eye camera;
distributing power to or between cameras and/or light sources;
compressing a scene image, a first eye image and/or a second eye image;
determining a gaze-related parameter based on a first and/or second eye image;
pre-processing a scene image received from the scene camera, a first eye image received from the first eye camera, and/or a second eye image received from the second eye camera;

forming a dataset comprising the scene image, the first eye image, the second eye image, the pre-processed scene image, the pre-processed first eye image, the pre-processed second eye image and/or a time stamp; and sending the dataset to the electric connector, in particular as network packets and/or an USB packets.

The scene camera may be fixedly integrated into the housing or detachably connectable to the module housing. The same may apply to the eye camera(s).

For reasons of accuracy, the scene camera may have a resolution of at least 640×480 pixels or at least 800×600 pixels, more typically of at least 1024×768 pixels, and even more typically of at least 1280×1024 pixels or at least 1920×1080 pixels (at least VGA SVGA or HD).

Different to the scene image(s), the resolution of the left and right images may be comparatively low. The pixel number of the left images and of the typically equally sized right images may be at most 40000, particularly at most 10000, particularly at most 5000, and more particularly at most 2500 or even 1000.

According to an embodiment, a head-wearable device includes a frame having a central portion which is, when the head-wearable device is worn by a user, arranged next to a nose of the user, and a first electric connector arranged in and/or on the central portion.

The frame of the head-wearable device is typically configured such that the head-wearable device can be worn on a head of a user, for example in a way usual glasses are worn. More particular, the frame and head-wearable device, respectively, complemented with the eye tracking module as described herein, more particular the eye tracking module of the complemented head-wearable device when worn by the user may be supported at least partially by a nose area of the user's face.

The head-wearable device may be a spectacle device, a pilot visor helmet, an AR head-wearable display, a VR head-wearable display or a goggles, for example a skiing-goggles, a swimming-goggles, a sports helmet, a head-band structure or a welding protective googles.

In embodiments referring to spectacle devices, the frame may include a first frame portion at least partly surrounding a first ocular opening, a second frame portion at least partly surrounding a second ocular opening, and the central portion may form (or be formed by) a bridge portion mechanically connecting the first frame portion and the second frame portion In other words, the head-wearable device may include a frame including a first frame portion at least partly surrounding a first ocular opening, a second frame portion at least partly surrounding a second ocular opening, a bridge portion mechanically connecting the first frame. portion and the second frame portion, and a first electric connector arranged on and/or in the bridge portion.

The frame of the head-wearable device may include a passage opening for receiving a protruding portion of the scene camera of the eye tracking module as explained herein.

Furthermore, the head-wearable device typically includes a second electric connector arranged in and/or on the frame of the head-wearable device, and an internal wiring electrically connecting the first electric connector and the second electric connector (for power supply and/or data exchange).

The second electric connector may be used for power supply from and/or data exchange with a companion computing device.

The second electric connector may be a USB-connector such as an USB-C-connector. However, the second electric connector may also be a connector for another external computer bus, in particular a computer bus and power connector such as a Thunderbolt-connector (Thunderbolt 3 uses USB-C connectors) or a Lightning connector (typically supporting the USB-protocol) or even an Ethernet-connector (Power over Ethernet).

Further, the second electric connector is typically arranged at a dorsal end of the frame of the head-wearable device and/or of a temple of the head-wearable device. Thereby a connection can be established in an unobtrusive way and wearing comfort is increased.

Via the second electric connector (and the wired connection within the head-wearable device), the eye tracking module may be connected with a (mobile) computing companion device such as smartphone, a tablet or the like, supplied with electric power from the companion device and even controlled by the companion device, for example by an app running on the companion device.

Furthermore, the companion device may be used for analysing the images of the cameras. For example, the companion device may be used for eye tracking and computing a sequence of gaze-direction related parameter(s) of the user, respectively, based on the camera images.

Accordingly, neither the eye tracking module nor the head-wearable device requires computing units of high power consumption.

Alternatively, the controller of the module may itself be adapted for determining a gaze-related parameter of the user.

Further, neither the eye tracking module nor the head-wearable device may have an internal energy storage such as a battery. Accordingly, the eye tracking module and the head-wearable (spectacles) device may be particularly lightweight. Further, less heat may be produced during device operation compared to a device with an internal (rechargeable) energy storage. This may also improve comfort of wearing.

Furthermore, no particular heat management, physical shields to protect the user, vents or the like may be required.

According to an embodiment, a system or set includes one or more head-wearable devices, and an eye tracking module as explained herein.

The system or set may include different types of a head-wearable devices each of which is exchangeably complementable with the eye tracking module.

Reference will now be made in detail to various embodiments, one or more examples of which are illustrated in the figures. Each example is provided by way of explanation, and is not meant as a limitation of the invention. For example, features illustrated or described as part of one embodiment can be used on or in conjunction with other embodiments to yield yet a further embodiment. It is intended that the present invention includes such modifications and variations. The examples are described using specific language which should not be construed as limiting the scope of the appended claims. The drawings are not scaled and are for illustrative purposes only. For clarity, the same elements or manufacturing steps have been designated by the same references in the different drawings if not stated otherwise.

With reference to FIGS. 1A to 1D, an embodiment of an eye tracking module 100 for attaching to a head-wearable devices of a user is explained.

As shown in FIG. 1A illustrating a front view of eye tracking module 100, a module housing 110 of module 100 may be mirror symmetric with respect to a virtual central plane S. Further, a lower portion 130 of housing 110 may have a left leg portion 134 and a right portion leg portion 135 formed such that a recess 138 for a user's nose is formed in lower portion 130.

In the exemplary embodiment, module housing 110 accommodates in an upper portion 120 a scene camera 160 and an electric connector 170, and, in the lower portion 130, a left eye camera 140 and a right eye camera 150.

More particular, the left leg portion 134 accommodates the left eye camera 140, and the right leg portion 135 accommodates the right eye camera 150.

The left eye camera 140 and the right eye camera 150 are arranged mirror symmetric to each other with respect to central plane S. Further, both the scene camera 160 and the electric connector 170 are arranged in and mirror symmetric with respect to central plane S.

Figure 1B:
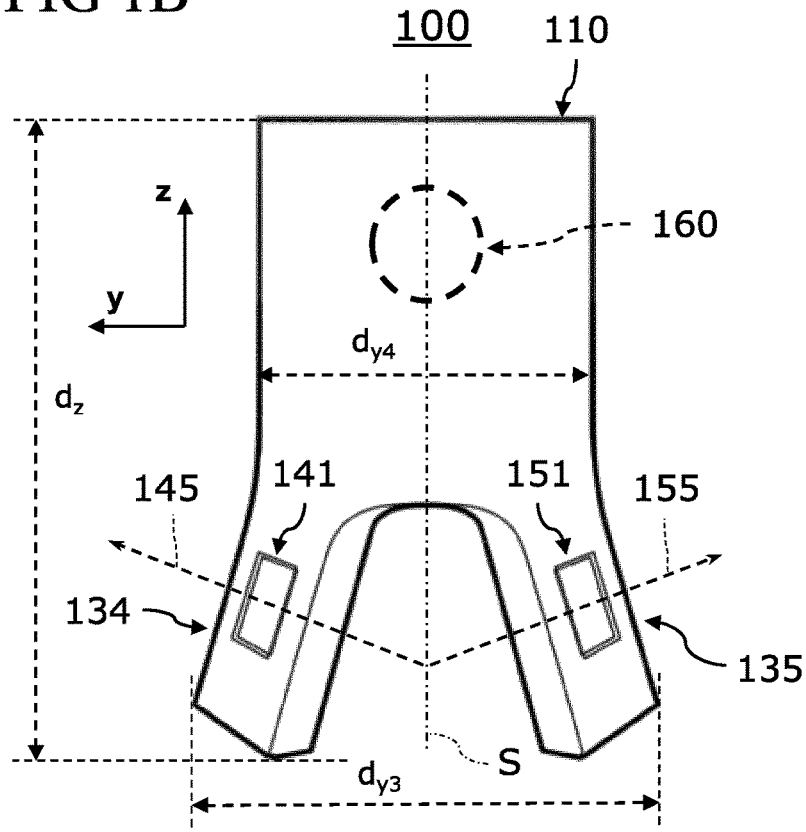
FIG. 1B illustrates a back view of the eye tracking module shown in FIG. 1A according to an embodiment.
Figure 1C:
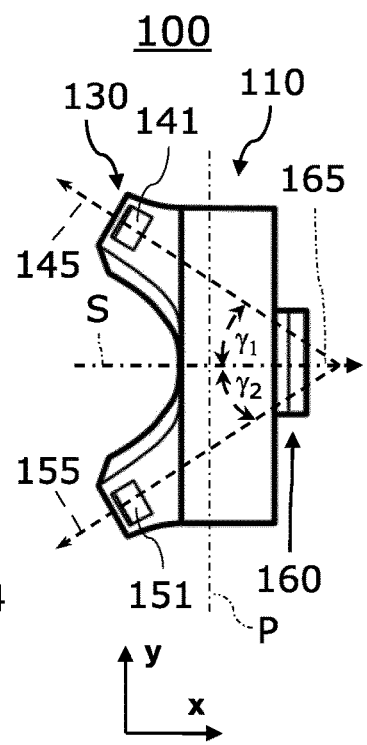
FIG. 1C illustrates a top view of the eye tracking module shown in FIG. 1A according to an embodiment.

In front view and in a projection onto a plane P perpendicular to the central plane S and the optical axis 165 (see also FIG. 1C illustrating a top view of module 100), respectively, the electric connector 170 is arranged between scene camera 160 and the eye cameras 140, 150.

Figure 1D:
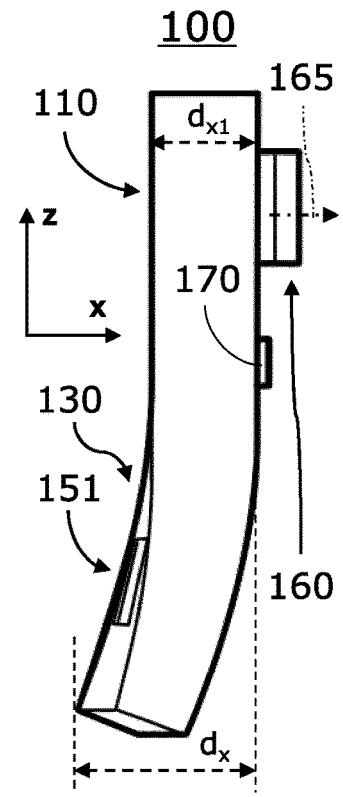
FIG. 1D illustrates a lateral view of the eye tracking module shown in FIG. 1A according to an embodiment.

For sake of clarity, not the eye cameras 140, 150 but recesses 141, 151 in module housing 110 for accommodating the eye cameras 140, 150 are illustrated in FIGS. 1B to 1D. For the same reason, neither electrical or mechanical contacts typically arranged in the recesses 141, 151 are shown in FIGS. 1B to 1D nor is the electric connector 170 shown in FIG. 1C. In FIG. 1A, eye cameras 140, 150 are indicated as slightly protruding from the housing 110, however they can be embodied completely integrated into the housing, with no protruding parts.

A first distance between the (first) left eye camera 140 and the central plane S is typically at most 20 mm, at least in front view and in the projection onto the plane P, respectively. Likewise, a second distance between the (second) right eye camera 150 and the central plane S is typically at most 20 mm, at least in front view and in the projection onto the plane P, respectively. In the exemplary embodiment, the eye cameras 140, 150 are mirror-symmetric with respect to central plane S. Accordingly, the first distance matches the second distance. The first and second distances may be respective minimum distances (each $d_{y1}/2$ in the exemplary embodiment) or more typically respective maximum distances (each $d_{y2}/2$ in the exemplary embodiment). Said first and second distances may also measure the respective distance between an (optical) center of the eye camera 140, 150 and the central plane S, in the direction perpendicular to plane S. Further, said camera centers may for example be half-way between $d_{y1}/2$ and $d_{y2}/2$.

In a projection onto a plane M which is perpendicular to the central plane S and the plane P and in top view, respectively, electric connector 170 and scene camera 160 may overlap with each other and/or be spaced apart from the eye cameras 140, 150.

As illustrated in FIG. 1C, a first angle $\gamma_1$ between and an optical axis 145 of left eye camera 140 and central plane S, and a second angle $\gamma_2$ between an optical axis 155 of right eye camera 150 and central plane S may be in a range from about 150° to 142° (or −30° to about −38°).

Furthermore, the first angle $\gamma_1$ may corresponds to the second angle $\gamma_2$, at least within an accuracy of 1° or even less.

The total height $d_z$ of module housing 110 (extension of modular housing 110 in a direction perpendicular to plane M, z-direction) may be in a range from about 2.5 cm to about 5 cm, more typically in a range from about 3 cm to about 4.5 cm.

The widths of modular housing 110, i.e. the extension of modular housing 110 in a direction perpendicular to the central plane S typically varies as function of the height (z) and is typically in a range from about 2 cm to 5 cm, more typically in a range from about 2 cm to about 4 cm.

As illustrated in FIGS. 1A, 1B, the width $dy_4$ of upper portion 120 may be substantially constant and/or lower than the maximum width $dy_3$ of lower portion 130, for example by a factor of 1.1 to 1.4.

As illustrated in FIGS. 1A to 1D, legs 134, 135 are typically bent.

Alternatively or in addition, the depth $d_{x1}$ (extension in direction of optical axis 165 of scene camera 160, which in the example shown is parallel to the x-direction) of module housing 110 may vary as function of height.

The depth $d_{x1}$ may be in a range from about 1 cm to about 2 cm, more typically in a range from about 1 cm to 1.7 cm.

The total extension $d_x$ in x-direction may be in a range from about 1.2 cm to about 3 cm, more typically in a range from about 1.5 cm to 2 cm.

As illustrated in FIG. 1D, the scene camera 160 may protrude from module housing 110.

However, the scene camera 160 and/or the electric connector 170 may also be arranged within module housing 110, i.e. such that they are accessible from the outside but do not protrude from the housing.

Figure 2A:
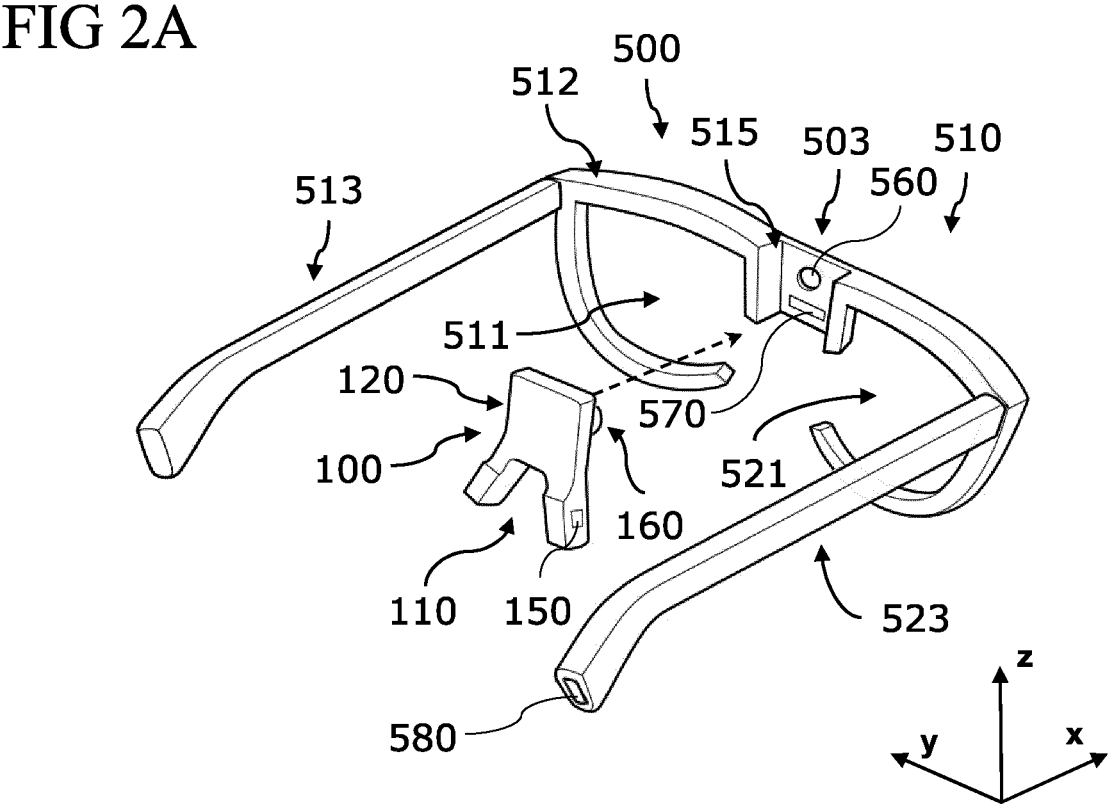
FIG. 2A illustrates a perspective view of a head-wearable device and an eye tracking module for attachably complementing the head-wearable device according to an embodiment.

FIG. 2A illustrates a perspective view of a head-wearable device 500 and eye tracking module 100 to be mounted to head-wearable device 500.

In the exemplary embodiment, head-wearable device 500 is implemented as spectacles device. Accordingly, frame 510 of spectacles device 500 has a front portion 512 only partly surrounding a left ocular opening 511 and a right ocular opening 521. A bridge portion 503 of front portion 512 is arranged between the ocular openings 511, 521. Further, a left temple 513 and a right temple 523 are attached to front portion 512.

However, bridge portion 503 includes a recess or opening 515 for receiving module housing 110 of module 100.

In the exemplary embodiment, the recess or opening 515 is formed such that upper portion 120 of module housing 110 fits into it.

To assist guidance during attaching eye tracking module 100 (see dashed arrow) and/or improve the grip in mounted/attached state, sidewalls of upper portion 120 and frame 510 in the bridge portion 503 may include respective interfitting structures such as a groove and a projection extending in x-direction.

Further, a first electric connector 570 fitting with the electric connector 170 (hidden in FIG. 2A) of module 100 is accommodated in bridge portion 503 and arranged on the wearer-side of bridge portion 503.

Furthermore, a passage opening 560 for scene camera 160 and the field of view (FOV) of scene camera 160, respectively, is formed in bridge portion 503.

In the exemplary embodiment, a second electric connector 580 in electric contact with the first electric connector 570 (via a not shown internal wiring) is accommodated at the dorsal and of right temple 523.

Electric connector 523 may be used for connecting with a companion device such as a smart phone or tablet. For example, electric connector 523 may be a USB-connector.

Figure 2B:
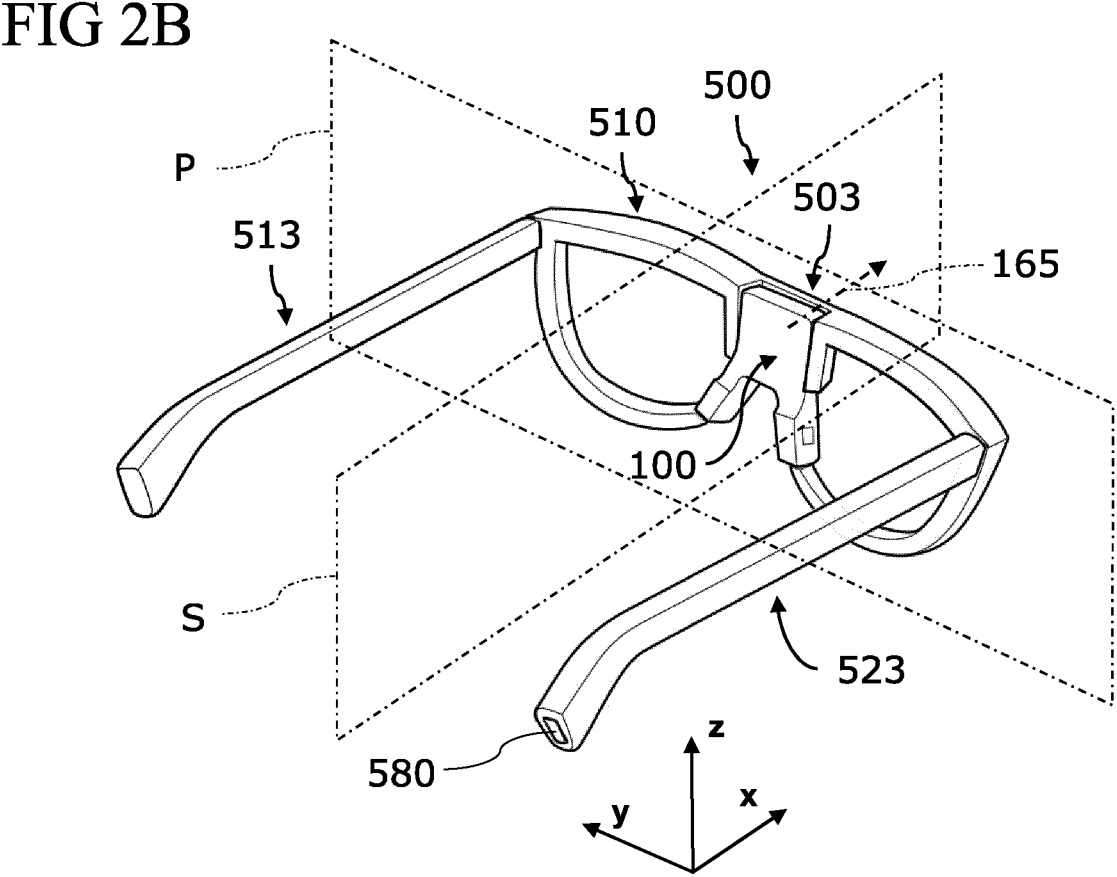
FIG. 2B illustrates a perspective view of the head-wearable device shown in FIG. 2A with the attached eye tracking module shown in FIG. 2A according to an embodiment.
Figure 3A:
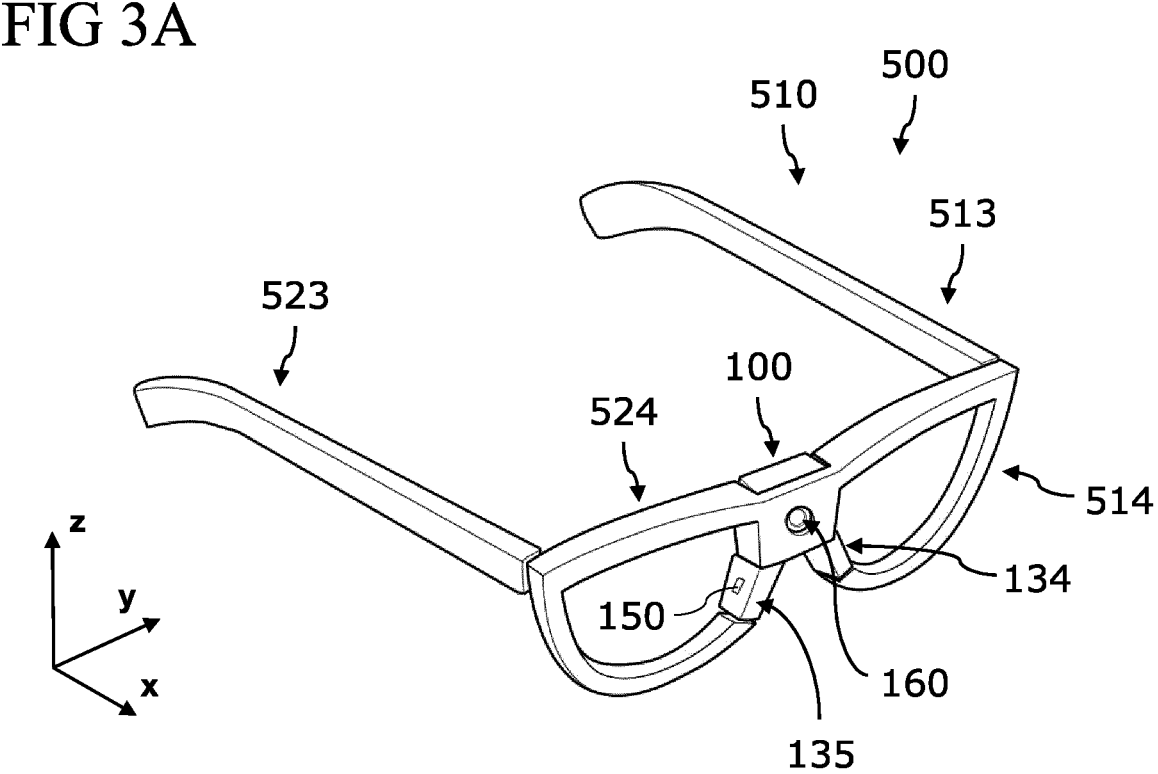
FIG. 3A illustrates another perspective view of the head-wearable device shown in FIG. 2A with the attached eye tracking module shown in FIG. 2A according to an embodiment.

FIGS. 2B, 3A illustrate respective perspective views of the head-wearable device 500 including the attached eye tracking module 100.

As illustrated in FIG. 2B, central plane S of module 100 may, in mounted state, also represent a symmetry plane for frame 510.

Further, in mounted state, leg portions 134, 135 of module 100 may at least substantially complement frame 510 below bridge portion 503 so that the ocular openings 512, 521 are at least substantially surrounded by material of frame 510 and module housing 110.

For sake of clarity, optional connection structures between lower ends of legs 134, 135 and free ends of frame 510 in the ocular regions are not shown in FIGS. 2B, 3A.

Figure 4A:
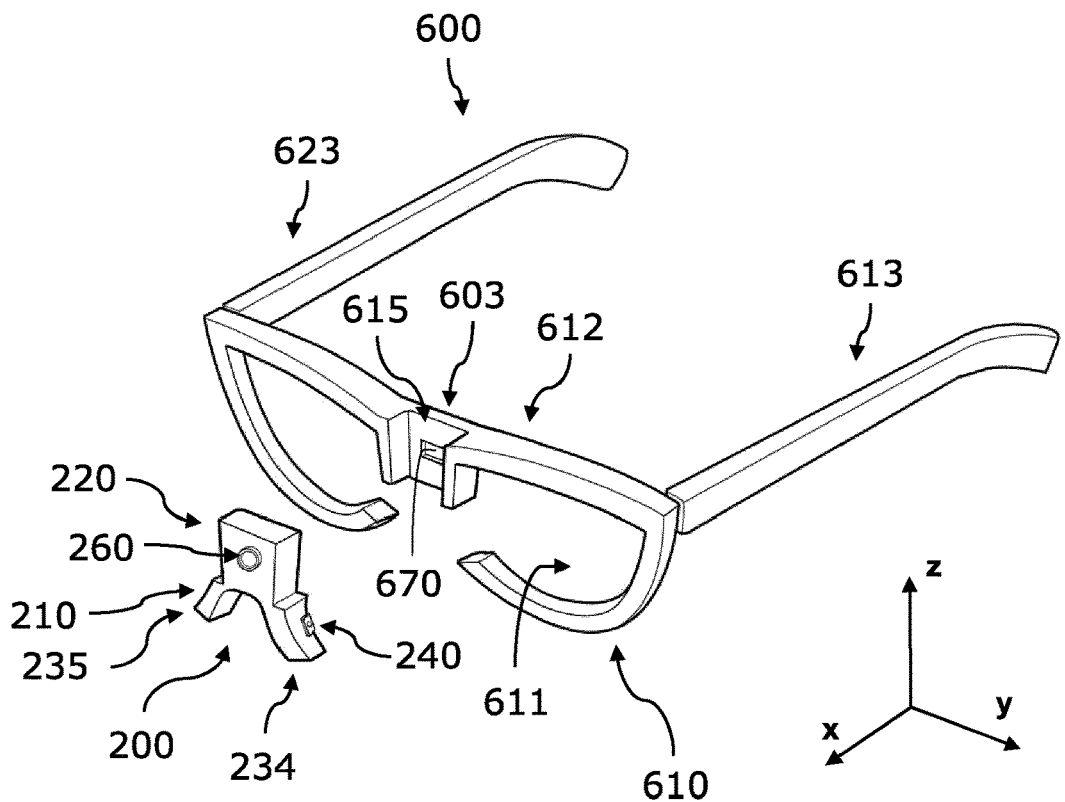
FIG. 4A illustrates a perspective view of yet another head-wearable device and yet another eye tracking module for attachably complementing the head-wearable device according to an embodiment.
Figure 4B:
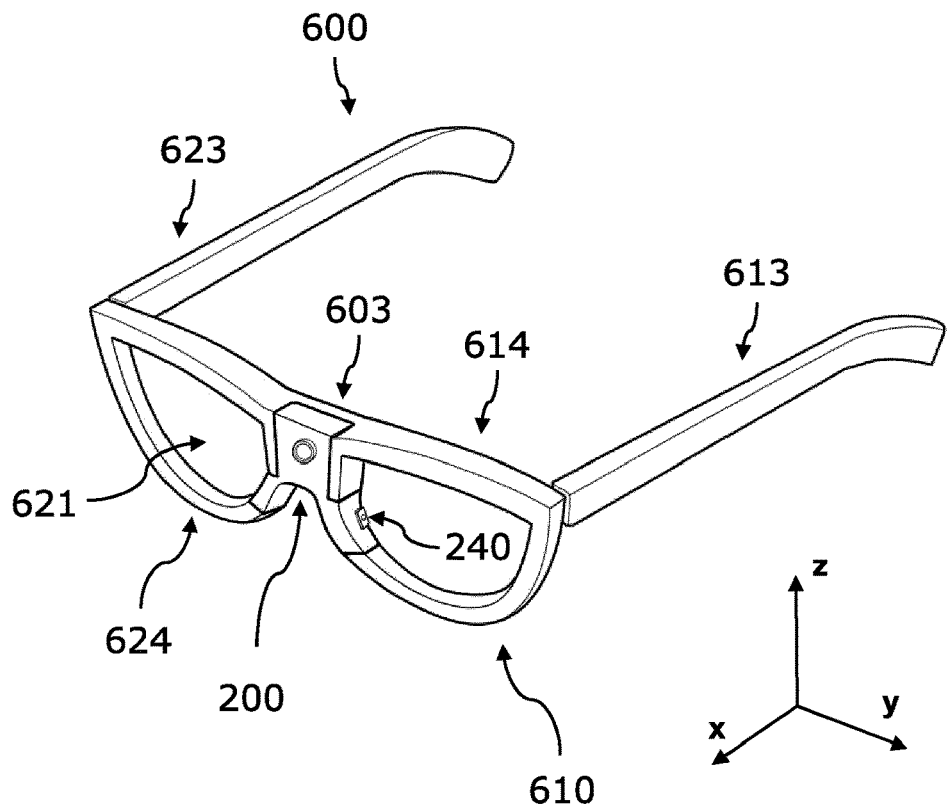
FIG. 4B illustrates a perspective view of the head-wearable device shown in FIG. 4A with the attached eye tracking module shown in FIG. 4A according to an embodiment.

FIG. 4A and FIG. 4B illustrate respective perspective views of a head-wearable device 600 and an eye tracking module 200. Head-wearable device 600 and eye tracking module 200 are similar to head-wearable device 500 and eye tracking module 100 explained above with regard to FIGS. 1A to 3A. In particular, module housing 210 of eye tracking module 200 is also shaped as a "nose-bridge"-like element for attachment to a typically at least substantially complementary frame structure in a (central) bridge portion 603 of a frame 610 of head-wearable device 600, in particular a recess or opening 615 of bridge portion 603.

However, recess or opening 615 including the electric connector 670 is formed at the front side of front portion 612 of frame 610. Accordingly, the electric connector (hidden in FIG. 4A) of module 200 is arranged at the backside of upper portion 220 of module housing 210, and thus opposite to the scene camera 260.

In this embodiment, passage opening for the scene camera 260 through bridge portion 603 of the frame 610 may not be provided.

Figure 5A:
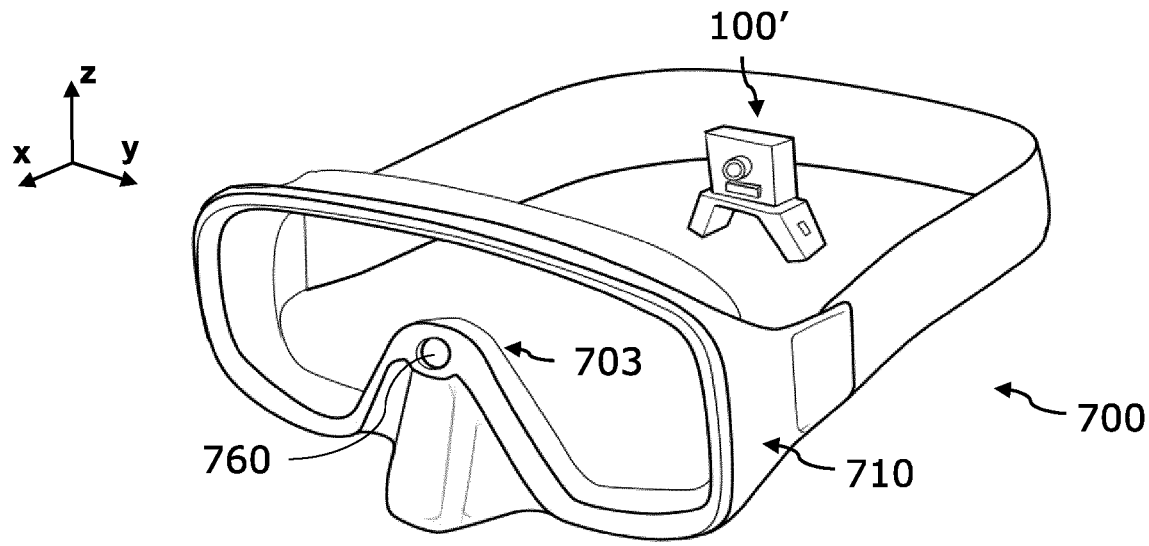
FIG. 5A-C illustrate perspective views of other head-wearables and another eye tracking module for attachably complementing the head-wearable devices according to an embodiment.
Figure 5B:
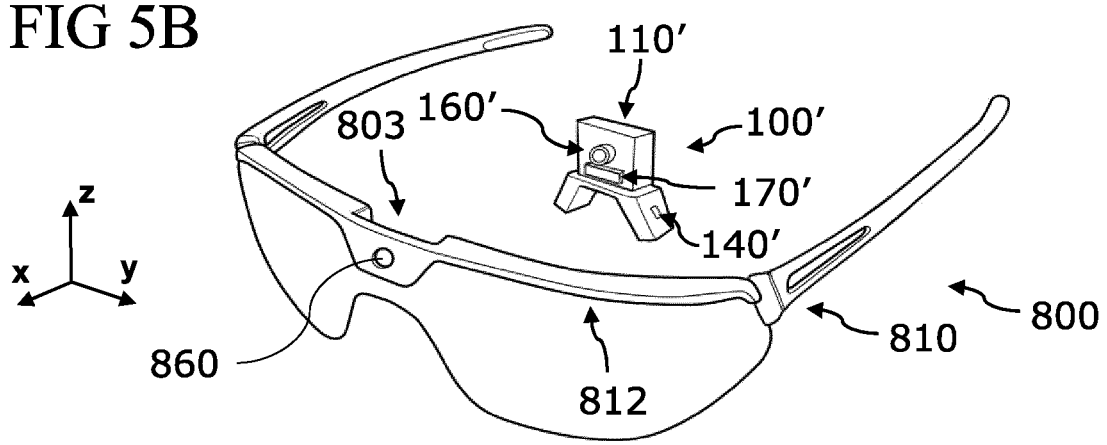
Figure 5C:
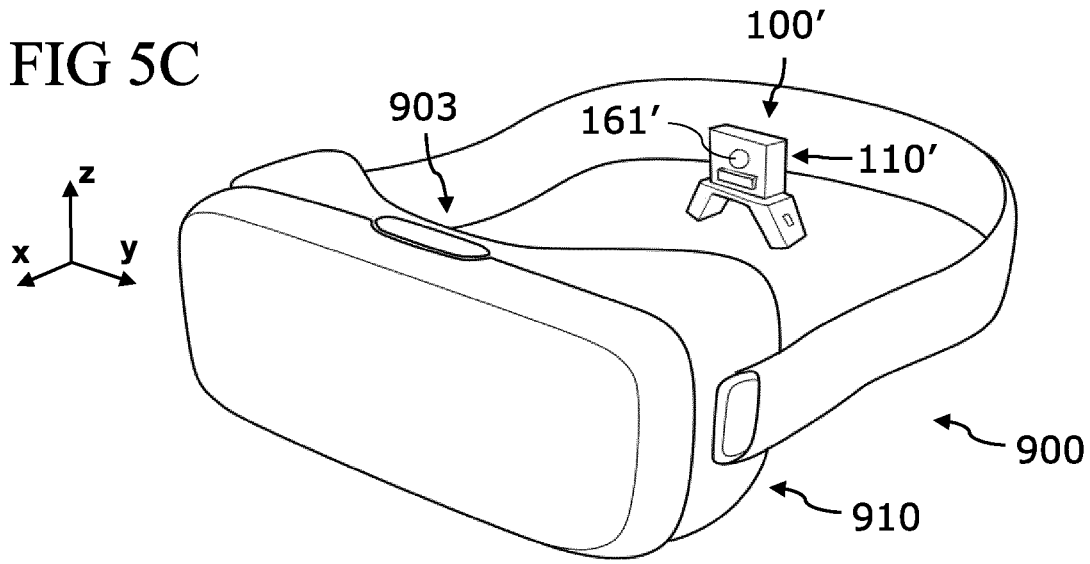

FIG. 5A-C illustrate perspective views of further head-wearables devices 700 to 900 and another eye tracking module 100' for attachably complementing head-wearable devices 700, 800, 900. This demonstrate the versatility of module 100'. In the exemplary embodiment, eye tracking module 100' is similar to eye tracking module 100 explained above with regard to FIG. 1A to FIG. 2B. In particular, the electric connector 170' and the scene camera 160' of eye tracking module 100' may also be arranged on a frontside of a module housing 110'. Accordingly, module 100' is suitable for attaching to a wearer-side of the respective central or bridge portion 703, 803, 903 of head-wearables 700-900.

While for the spectacles device (skiing-goggles) 800 of FIG. 5B a front-side connection strategy similar to what is shown in FIGS. 4A, 4B would also be possible, FIG. 5A and FIG. 5C show head-wearables 700, 900 which better lend themselves to a wearer-side connection of the module 100', namely a diving goggles 700 and a VR-type head-wearable device 900, respectively.

Internal wiring and a cooperating connector on the head-wearables 700-900 (both not shown) serve as power supply for module 100' and data interface to and from module 100', as in the previously described embodiments.

Since a scene camera can be dispensed with in case of use of module 100' together with a VR-type head-wearable device 900 FIG. 5C, module 100' is shown without scene camera in this variant. The scene camera of module 100' can either be removable, or it can be provided in a manner such that it does not protrude from the housing 110'. In both cases a lid 161' may be provided to close the corresponding opening in the module housing 110'. Alternatively, modules without scene camera can be provided for this use case.

According to an embodiment, a camera module comprises a module body comprising an upper portion and a lower portion, in particular a module housing comprising respective portions. The upper portion comprises an electric connector for connecting with a corresponding connector of a head-wearable device of a user, and a scene camera in electric contact with the electric connector. The lower portion is at least substantially mirror symmetric with respect to a central plane, and shaped to partly surround a nose of the user. The camera module further comprises at least two of: a scene camera accommodated in the upper portion, and in electric contact with the electric connector; a left eye camera accommodated in the lower portion, and in electric contact with the electric connector; and a right eye camera accommodated in the lower portion, and in electric contact with the electric connector.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Such modifications to the inventive concept are intended to be covered by the appended claims.

Spatially relative terms such as "under", "below", "lower", "over", "upper" and the like are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

REFERENCE NUMBERS 100, 100', 200 eye tracking module/add-on camera module
110, 110', 210 module housing
120, 220 upper portion of module housing
130, 230 lower portion/nose bridge portion of module housing
134, 234 first/left leg
135, 235 second/right leg
136, 236 first/left nose tab
137, 237 second/right nose tab
138, 238 recess for a user's nose
140, 140'. 240 first/left (eye) camera
141, 241 recess for first/left (eye) camera
145, 245 optical axis of first/left (eye) camera
150, 250 second/right (eye) camera
151, 251 recess for second/right (eye) camera 155, 255 optical axis of/second/right (eye) camera
160, 160', 260 scene camera
165, 265 optical axis of scene camera
170, 170', 270 electric connector (plug/socket, electro-mechanical connector)
500-900 head-wearable (spectacles) device
503, 603, 703, 803, 903 (nose) bridge portion
510, 610 (spectacles) body/frame
511, 611 first/left ocular opening
512, 612, 812 front portion of body/frame
513, 613 first/left holder/temple (arm)
514, 614 first/left frame portion for spectacle lenses
515, 615 recess/opening in frame for eye tracking module/module housing
521, 621 second/right ocular opening
523, 623 second/right holder/temple (arm)
524, 624 second/right frame portion for spectacle lenses
560, 760, 860 opening for scene camera
570, 670 first electric connector (socket/plug)
580, 680 second electric connector (socket/plug)/USB-connector, USB-C receptacle
S middle/central/vertical/symmetry plane of module/spectacles body
P projection plane, typically defined by the optical axis of the scene camera
M module plane, typically perpendicular to plane S and/or P

The invention claimed is:

1. An eye tracking module for attachably complementing a head-wearable device of a user, the eye tracking module comprising:
    a module housing which is, at least in a lower portion, at least substantially mirror symmetric with respect to a central plane and shaped to partly surround a nose of the user;
    a scene camera arranged in and/or on the module housing; and at least one of:
    a first eye camera arranged in and/or on the lower portion of the module housing, wherein a first distance between the first eye camera and the central plane is at most about 20 mm; and
    a second eye camera arranged in and/or on the lower portion of the module housing, wherein a second distance between the second eye camera and the central plane at least substantially corresponds to the first distance and/or is at most about 20 mm,
    wherein the module housing comprises an upper portion, wherein the upper portion is substantially mirror symmetric with respect to the central plane, wherein the lower portion comprises a first leg portion and a second leg portion which are least substantially mirror-symmetric with respect to the central plane, wherein the scene camera is arranged in the upper portion of the module housing, wherein the module housing comprises two shells, wherein the module housing and/or the two shells comprises a metal or a plastics, wherein the module housing is made of the two shells, wherein the module housing is at least substantially rigid, wherein the module housing is watertight, and/or wherein the module housing comprises a mechanical connector adapted to cooperate with a corresponding counterpart of the head-wearable device, and selected from the list of a magnetic connector, a screw connection, a snap fit connection, a friction fit, a velcro-based connector, and a connection principle for establishing a permanent, non-releasable connection, such as via gluing, welding or friction welding.

2. The eye tracking module of claim 1, further comprising an electric connector arranged in and/or on the module housing, and in electric connection with at least one of the scene camera, the first eye camera and the second eye camera.

3. The eye tracking module of claim 2, further comprising at least one of:
    a first light source arranged next to the first eye camera;
    a second light source arranged next to the second eye camera; and
    a controller in electric connection with at least one of the electric connector, the scene camera, the first eye camera and the second eye camera.

4. The eye tracking module of claim 3, wherein the controller is configured for at least one of:
    receiving control commands via the electric connector;
    triggering a respective image or video recording of the scene camera, the first eye camera and/or the second eye camera;
    distributing power to or between cameras and/or light sources;
    pre-processing a scene image received from the scene camera, a first eye image received from the first eye camera, and/or a second eye image received from the second eye camera;
    compressing the scene image, the first eye image and/or the second eye image;
    determining a gaze-related parameter based on the first eye image and/or the second eye image;
    forming a dataset comprising the scene image, the first eye image, the second eye image, the pre-processed scene image, the pre-processed first eye image, the pre-processed second eye image and/or a time stamp; and
    sending the dataset to the electric connector, in particular as network packets and/or an USB packets.

5. The eye tracking module of claim 1, wherein at least one of the first distance and the second distance is at most about 15 mm, at most about 14 mm, or even at most about 12 mm, wherein at least one of the first distance and the second distance is at least about 2 mm or even at least about 5 mm, and/or wherein the first eye camera and the second eye camera are at least substantially arranged mirror symmetric with respect to the central plane.

6. The eye tracking module of claim 1, wherein the scene camera comprises an optical axis which is at least substantially arranged in the central plane, and/or wherein the scene camera is fixedly integrated into the module housing or detachably connectable to the module housing.

7. The eye tracking module of claim 1, further comprising at least one of:
    a first nose pad attached to the first leg portion; and
    a second nose pad attached to the second leg portion.

8. The eye tracking module of claim 7, wherein at least one of the first nose pad and the second nose pad is adjustably and/or exchangeably attached to the respective leg portion, wherein the first eye camera is arranged on and/or in the first leg portion, and/or wherein the second eye camera is arranged on and/or in the second leg portion.

9. The eye tracking module of claim 1, wherein at least one of a first angle between an optical axis of the first eye camera and the central plane, and a second angle between an optical axis of the second eye camera and the central plane is in a range from about 150° to 142°, more typically about 144°, and/or wherein the first angle at least substantially corresponds to the second angle.

10. An eye tracking module for attachably complementing a head-wearable device of a user, the eye tracking module comprising:
- a module housing which is, at least in a lower portion, at least substantially mirror symmetric with respect to a central plane and shaped to partly surround a nose of the user;
- a scene camera arranged in and/or on the module housing;
- at least one of a first eye camera arranged in and/or on the lower portion of the module housing, and a second eye camera arranged in and/or on the lower portion of the module housing; and
- an electric connector arranged in and/or on the module housing, and in electric connection with at least one of the scene camera, the first eye camera and the second eye camera,
- wherein the electric connector of the module housing is arranged in the central plane, wherein the electric connector of the module housing is arranged between the first eye camera and the second eye camera, and/or between the scene camera and at least one of the first eye camera and the second eye camera, wherein the electric connector of the module housing is implemented as a plug or a socket, wherein the electric connector of the module housing is an electro-mechanical connector, wherein the electric connector of the module housing fits with a corresponding electric connector of the head-wearable device, wherein the electric connector of the module housing is arranged on the same side of the eye tracking module and/or facing in the same general direction as the scene camera or opposite thereto, wherein the electric connector of the module housing is arranged on a top surface of the eye tracking module, wherein the scene camera is arranged in the central plane, wherein at least one of the scene camera and the electric connector of the module housing is, in a projection onto a plane perpendicular to the central plane, arranged between the first eye camera and the second eye camera, wherein the electric connector of the module housing is, in the projection onto a plane perpendicular to the optical axis of the scene camera, arranged between the scene camera and at least one of the first eye camera and the second eye camera, and/or wherein the electric connector of the module housing is in electric connection with the scene camera, the first eye camera and the second eye camera.

11. The eye tracking module of claim 10, wherein a first distance between the first eye camera and the central plane is at most about 20 mm, wherein a second distance between the second eye camera and the central plane at least substantially corresponds to the first distance, and/or wherein the second distance is at most about 20 mm.

12. A system, comprising:
- a head-wearable device; and
- an eye tracking module comprising:
  - a module housing which is, at least in a lower portion, at least substantially mirror symmetric with respect to a central plane and shaped to partly surround a nose of the user;
  - a scene camera arranged in and/or on the module housing; and at least one of:
  - a first eye camera arranged in and/or on the lower portion of the module housing, wherein a first distance between the first eye camera and the central plane is at most about 20 mm; and
  - a second eye camera arranged in and/or on the lower portion of the module housing, wherein a second distance between the second eye camera and the central plane at least substantially corresponds to the first distance and/or is at most about 20 mm,
  - wherein the module housing comprises an upper portion, wherein the upper portion is substantially mirror symmetric with respect to the central plane, wherein the lower portion comprises a first leg portion and a second leg portion which are least substantially mirror-symmetric with respect to the central plane, wherein the scene camera is arranged in the upper portion of the module housing, wherein the module housing comprises two shells, wherein the module housing and/or the two shells comprises a metal or a plastics, wherein the module housing is made of the two shells, wherein the module housing is at least substantially rigid, wherein the module housing is watertight, and/or wherein the module housing comprises a mechanical connector adapted to cooperate with a corresponding counterpart of the head-wearable device, and selected from the list of a magnetic connector, a screw connection, a snap fit connection, a friction fit, a velcro-based connector, and a connection principle for establishing a permanent, non-releasable connection, such as via gluing, welding or friction welding.

13. The system of claim 12, wherein the head-wearable device comprises:
- a frame comprising a central portion which is, when the head-wearable device is worn by a user, arranged closest to a nose of the user; and
- a first electric connector arranged in and/or on the central portion.

14. The system of claim 12, wherein the system comprises head-wearable devices of different types, wherein each head-wearable device is exchangeably complementable with the eye tracking module, and/or wherein the system comprises at least one of a spectacles device, a pilot visor helmet, a goggles, a skiing-goggles, a swimming-goggles, a sports helmet, a head-band structure and a welding protective googles.

* * * * *